United States Patent [19]

Take

[11] Patent Number: 5,420,982
[45] Date of Patent: May 30, 1995

[54] HYPER-CUBE NETWORK CONTROL SYSTEM HAVING DIFFERENT CONNECTION PATTERNS CORRESPONDING TO PHASE SIGNALS FOR INTERCONNECTING INTER-NODE LINKS AND BETWEEN INPUT/OUTPUT LINKS

[75] Inventor: Riichiro Take, Setagaya, Japan
[73] Assignee: Fujitsu Limited, Kawasaki, Japan
[21] Appl. No.: 22,417
[22] Filed: Feb. 16, 1993

Related U.S. Application Data

[63] Continuation of Ser. No. 754,235, Aug. 26, 1991, abandoned, which is a continuation of Ser. No. 234,133, Aug. 19, 1988, abandoned.

[30] Foreign Application Priority Data

Aug. 19, 1987 [JP] Japan .................. 62-205416

[51] Int. Cl.⁶ ................................. G06F 15/16
[52] U.S. Cl. .................. 395/200; 364/DIG. 1; 364/240.5; 364/240.7; 364/241.8; 364/241.9
[58] Field of Search ............... 364/200, 900, 371, 370; 395/200

[56] References Cited

U.S. PATENT DOCUMENTS

| | | | |
|---|---|---|---|
| 3,296,426 | 1/1967 | Ball | 364/200 |
| 3,308,436 | 3/1967 | Brock, Jr. et al. | 364/200 |
| 3,312,943 | 4/1967 | McKindles et al. | 364/200 |
| 3,364,472 | 6/1968 | Sloper | 364/200 |
| 3,815,095 | 6/1974 | Wester | 364/200 |
| 4,195,344 | 5/1980 | Yamazaki | 364/200 |
| 4,270,170 | 5/1981 | Reddaway | 364/200 |
| 4,470,114 | 9/1984 | Gerhold | 364/200 |
| 4,575,796 | 3/1986 | Wako | 364/200 |
| 4,665,483 | 5/1987 | Ciacci et al. | 364/200 |
| 4,709,327 | 11/1987 | Hills et al. | 364/200 |
| 4,739,476 | 4/1988 | Fiduccia | 364/200 |
| 4,766,534 | 8/1988 | DeBenedictis | 364/200 |
| 4,805,091 | 2/1989 | Thiel et al. | 364/200 |
| 4,814,980 | 3/1989 | Peterson et al. | 364/200 |
| 4,819,035 | 5/1989 | Chamberlain | 364/200 |
| 4,868,818 | 9/1989 | Maclan et al. | 371/11.3 |
| 4,870,568 | 9/1989 | Kahle et al. | 364/200 |
| 4,891,751 | 1/1990 | Call et al. | 364/200 |
| 4,933,933 | 1/1990 | Dally et al. | 370/60 |
| 4,933,936 | 6/1990 | Rasmussen et al. | 370/85.9 |
| 5,047,917 | 9/1991 | Athas et al. | 364/200 |
| 5,058,001 | 10/1991 | Li | 364/200 |

FOREIGN PATENT DOCUMENTS

0187994 12/1985 European Pat. Off. .
WO87/01485 3/1987 WIPO .

OTHER PUBLICATIONS

John P. Hayes et al., "A Microprocessor-based Hyper-Cube Supercomputer", IEEE, pp. 6–17, 1986.
Y. Chow, R. Dixon, T. Feng, An Interconnection Network for Processor Communication with Optimized Local Connections, pp. 65–74, Proceeding of the 1980 International Conference on Parallel Processing, Aug. 26–29, 1980.
European Search Report for Application EP 88 30 7621, The Hague, May 2, 1989.
International Search Report for application PCT/GB86/00514 European Patent Office, Nov. 18, 1986.
"A Multiport Page-Memory Architecture and A Multiport Disk-Cache System" by Tanaka.
"Interconnection Networks for Parallel and Distributed Processing" by Bhuyan.
"The Performance of Multicomputer Interconnecetion Networks" by Reed, Grunwald.

*Primary Examiner*—Christopher B. Shin
*Attorney, Agent, or Firm*—Staas & Halsey

[57] ABSTRACT

A network control system in a hyper cube type network having $2^n$ nodes (n>0, integer), each of the nodes being arranged on an apex of a cube and having n sets of links for interconnecting other nodes so as to form an n-dimensional hyper cube type network; a plurality of processors, each processor being connected to each node by input/output links, thereby providing communication paths between processors through the nodes and links; each of the nodes comprising: a device for setting $2^n$ different connection patterns corresponding to $2^n$ phase signals, and a switching device for interconnecting between the links and between the input/output links in accordance with the connection patterns synchronized with the phase signals.

3 Claims, 17 Drawing Sheets

HYPER-CUBE NETWORK CONTROL SYSTEM HAVING DIFFERENT CONNECTION PATTERNS CORRESPONDING TO PHASE SIGNALS FOR INTERCONNECTING INTER-NODE LINKS AND BETWEEN INPUT/OUTPUT LINKS

This application is a continuation of application Ser. No. 07/754,235, filed Aug. 26, 1991, abandoned, which is a continuation of application Ser. No. 07/234,133, filed on Aug. 19, 1998, abandoned.

BACKGROUND OF THE INVENTION

1. Field of the Invention

The present invention relates to a network control system in a hyper cube type network used in a multi-processor interconnection system.

2. Description of the Related Art

As is well known, the hyper cube type network has a plurality of nodes ($2^n$ nodes, $n>0$, integer), each node being arranged on an apex of the cube, a plurality of links connecting the nodes, and a plurality of processors, each connected to each node.

In general, two types of the multi-processor interconnection system are used, i.e., a multi-stage network and a multi-processor network.

The multi-stage network includes various types of networks based on differences in the connection configuration thereof. For example, an omega network, a delta network, a banyan network, a shuffle-exchange network, etc. In general, these types, for example, the omega network and the shuffle-exchange network, have a plurality of switch boxes, and each switch box generally has two input terminals and two output terminals. Each switch box can take two connection configurations, i.e., cross and straight corresponding to a bit "1" and a bit "0". The switch boxes are connected by links from input stages to output stages in accordance with the above connection configurations, to form communication paths.

In these types of multi-stage networks, however, although a high transfer speed can be achieved, a problem arises in that the number of communication paths which can be simultaneously used is limited, because the switch box can deal with only one communication path at a time.

The multi-processor network is constituted by a plurality of nodes and links connected between the nodes, wherein each node has at least one buffer memory for temporarily storing input messages. This type of network has connection configurations, such as, a ring type, tree type, hyper cube type, etc., in accordance with different arrangements of the nodes. In these types of network, however, a problem arises in that much time is required for writing/reading a message to and from the buffer memory. Thus, transmission of a message is delayed in an all-to-all burst communication when many loads are connected to the network.

The hyper cube type network can be obtained in both the multi-stage and the multi-processor type of network, depending upon the connection configuration of the nodes and the links, by rewriting a topology thereof. That is, a network having the hyper cube topology can exist in both multi-stage and multi-processor networks. In particular, it is possible to modify the shuffle-exchange network to the hyper cube topology by rewriting the structure thereof when the former does not have the hyper cube topology.

The present invention features an improvement of the total processing performance of the processors connected to the hyper cube type network, particularly, in an all-to-all burst communication. The all-to-all burst communication is a communication pattern in which each processor can simultaneously communicate to all processors including itself in the system. Therefore, in the present invention, all communication paths are structured to achieve an effective all-to-all burst communication in the hyper cube type network.

One example of the multi-stage network is disclosed in, New Generation Computing, 1984, "A Multi Page-Memory Architecture and A Multiport Disk-Cache System", by Yuzuru Tanaka. This network is constituted by a plurality of ports, a plurality of memory banks, a plurality of switch boxes, and a controller. The controller controls the connection of switch boxes based on a predetermined control program. In this reference, however, the network is formed between the ports and the memory banks. Further, the topology of the network is a type of the shuffle-exchange network, and the switch box comprises two inputs and two outputs. These are important differences from the present invention. Note, if the network of the reference is rewritten to the hyper cube topology, one half of the links are not used, and thus the processing performance is unsatisfactory.

SUMMARY OF THE INVENTION

The object of the present invention is to provide a which control system in a hyper cube type network enables a uniform access upon an all-to-all burst communication among all nodes without congestion and waiting at the links, thereby improving the processing performance of the processor.

In accordance with the present invention, there is provided a network control system in a hyper cube type network having $2^n$ nodes ($n>0$, integer), each node being arranged on an apex of a cube, and n sets of links for interconnecting the nodes to form an n-dimensional hyper cube type network and a plurality of processors, each processor being connected to each node by input-/output links, thereby providing communication paths between processors through the nodes and links, each of the nodes comprising a device for setting $2^n$ different connection patterns corresponding to $2^n$ phases in a phase signals, and a switching device for interconnecting between the links and between the input/output links in accordance with the connection patterns synchronizing with the phase signals.

DESCRIPTION OF THE PREFERRED EMBODIMENTS

Before describing the preferred embodiments, an explanation will be given of a conventional hyper cube type network.

Figure 1:
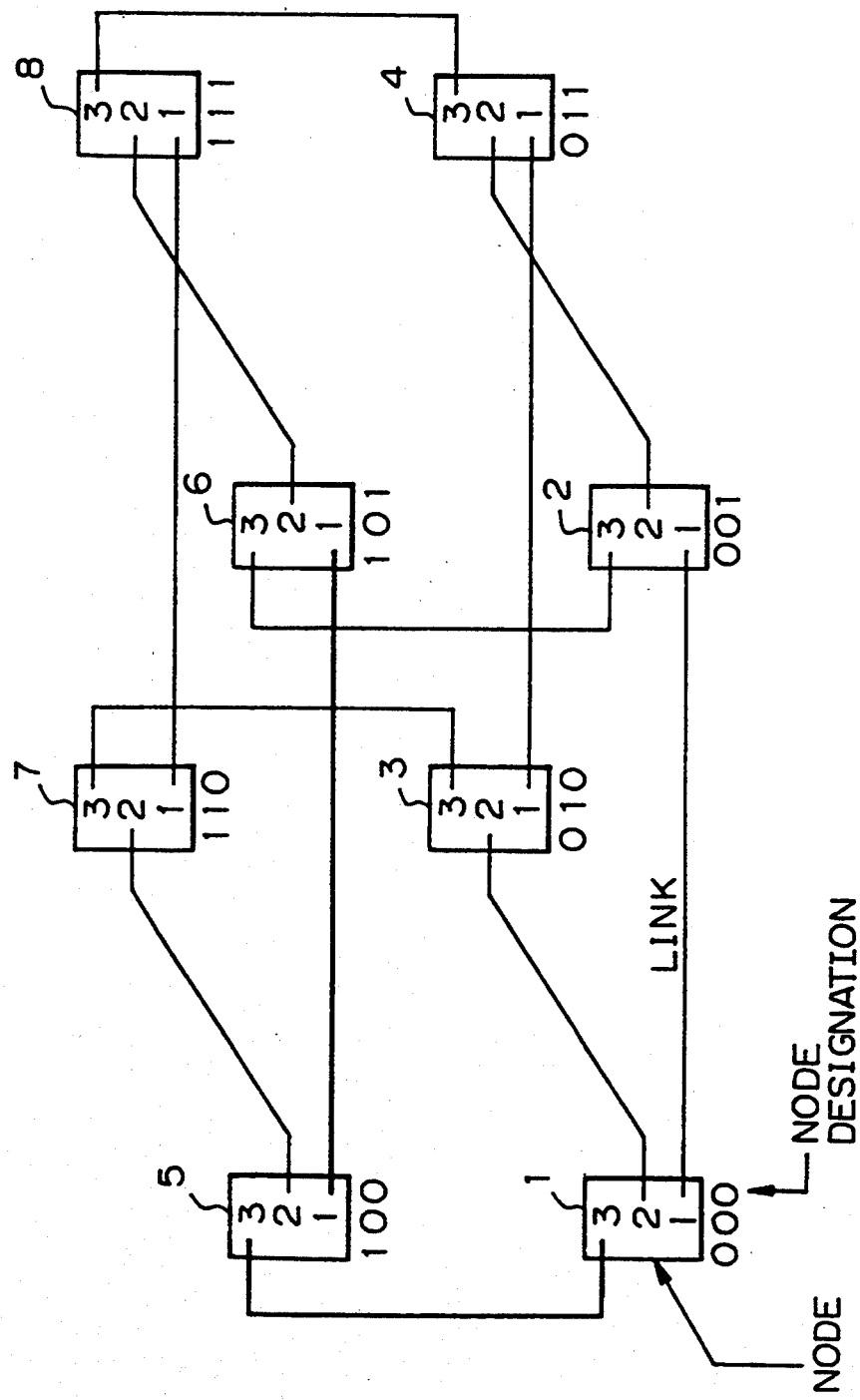
FIG. 1 is a schematic diagram of one example of the structure of a three-dimensional hyper cube type network having eight nodes.

FIG. 1 is a schematic diagram of one example of the structure of a three-dimensional (n=3) hyper cube type network having eight ($2^3$=8) nodes 1 to 8. Each node is designated by binary numbers "000" "001"—"111" has three links, and is connected to another node based on the following connection rule. For example, the first bit of the node designation of the node 1 is different from that of the node 2, and thus the link 1 of the node I is connected to the link 1 of the node 2. Further, the second bit of the node designation of the node i is different from that of the node 3, and accordingly, the link 2 of the node 1 is connected to the link 2 of the node 3. Still further, the third bit of the node designation of the node 1 is different from that of the node 5, and therefore, the link 3 of the node 1 is connected to the link 3 of the node 5. The same rule is applied to the other nodes, and thus all of the nodes are connected to each other in such a manner that they constitute a three-dimensional hyper cube type network.

in general, $2^n$ nodes are distinguished by $2^n$ node designations. Each of the node designations can be expressed by a binary number having n bits in the n-dimensional hyper cube type network. As is obvious from the above example, each node is connected to n other nodes.

Figure 2:
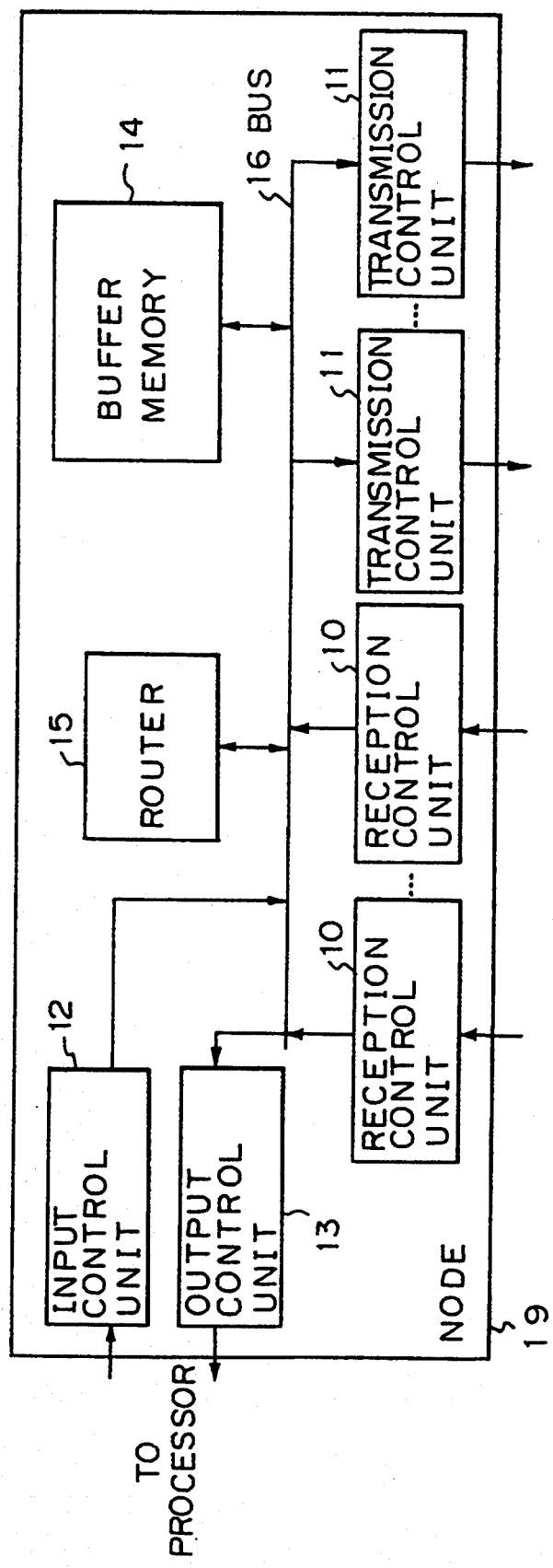
FIG. 2 is a schematic block diagram of a conventional node.

FIG. 2 is a schematic block diagram of a conventional node. This node is used in a multi-processor network.

In FIG. 2, reference number 10 denotes a reception control unit, 11 a transmission control unit, 12 an input control unit, 13 an output control unit, 14 a buffer memory, 15 a router, and 16 a bus line.

The input control unit 12 and the output control unit 13 are connected to the processor (not shown), for controlling the reception or transmission of messages from or to the processor. The reception control unit 10 and the transmission control unit 11 are connected to links for controlling the transmission and reception of messages from another node. The buffer memory 14 temporarily stores transmission and reception messages, and the router 15 distinguishes an address of the message and routes it to another node to which it is to be relayed.

The reception control unit 10 and the input control unit 12 transfer messages input from the processor and the link, and the buffer memory 14 stores the messages in a predetermined memory area. The transmission control unit 11 and the output control unit 13 transfer the messages read out from the memory area under the control of the router 15.

The router 15 comprises a suitable processing means for running a control program. Based on the control program, the router 15 distinguishes the node designation of the destination of the received message, determines the transmission destination to which it is to be relayed, and sends a command concerning the destination to the transmission control unit 11 and the output control unit 13.

In each nodes the message from the processor has the node designation of the destination at the head thereof, and the input control unit 12 informs the router 15 that the message has been stored. Router 15 compares the node designation of the destination of the received message stored in the buffer memory 14 with its own node designation. If the former coincides with the latter, the destination of the received message is determined to be its own node. In this case, the received message is output to the processor connected to its own node through the output control unit 13. If the former does not coincide with the latter, the received message is output to another node having the number corresponding to the inconsistent bit of the former and the latter.

For example, when the above node is applied to the hyper cube type network shown in FIG. 1, if the message is transmitted from node 1 (000) to node 6 (101) through the link (indicated by thick lines), the message from the processor connected to node 1 is temporarily stored in the buffer memory 14 of the node 1. The router 15 then compares the node designation "101" of the destination node 6 with the own node designation "000" of the node 1 and determines the link to be selected. In this case, since the first and the third bits of the node designation "000" and the node designation "101" are different, the link denoted by the thick line is selected.

Namely, when the router 15 of node 1 selects the third link, the message is transferred from the buffer memory 14 of the node 1 to the third link through the transmission control unit 11, and the message is stored in the buffer memory 14 of node 5 through the reception control unit 10 therein. The router 15 of node 5 compares the node designation "101" of the destination node 6 with the own node designation "100" of the node 5, and determines the link to be selected. In this case, since the first bit is different in the node designation "101" the message is transferred from the buffer memory 14 of node 5 to the first link through the transmission control unit 11 therein. The message is stored in the buffer memory 14 of the node 6 through the reception control unit 10 therein, the router 15 of node 6 distinguishes that the message designates its own node designation "101" and the message is then transferred to the processor connected to node 6 through the output control unit 13 therein.

As explained above, since the control of each node is independently performed, a plurality of messages can be transferred and processed in parallel in the hyper cube type network. Nevertheless, problems arise in the conventional node when it is applied to the hyper cube type network and many messages to be processed exist in the network.

First, the message quantities passing through each of the links are unbalanced. As a result, a complex relationship of busy links and not-busy links exists in the network since it is not possible to have completely uniform message quantities passing through each link. Accordingly, the rate of utilization of the link is reduced, and thus the total processing performance of the network is considerably lowered.

Second, a router having a higher processing performance must be provided in each node, to process the many messages passing through the link. As a result, the manufacturing cost per node is increased.

A network control system according to the present invention will be explained in detail hereinafter.

Figure 3:
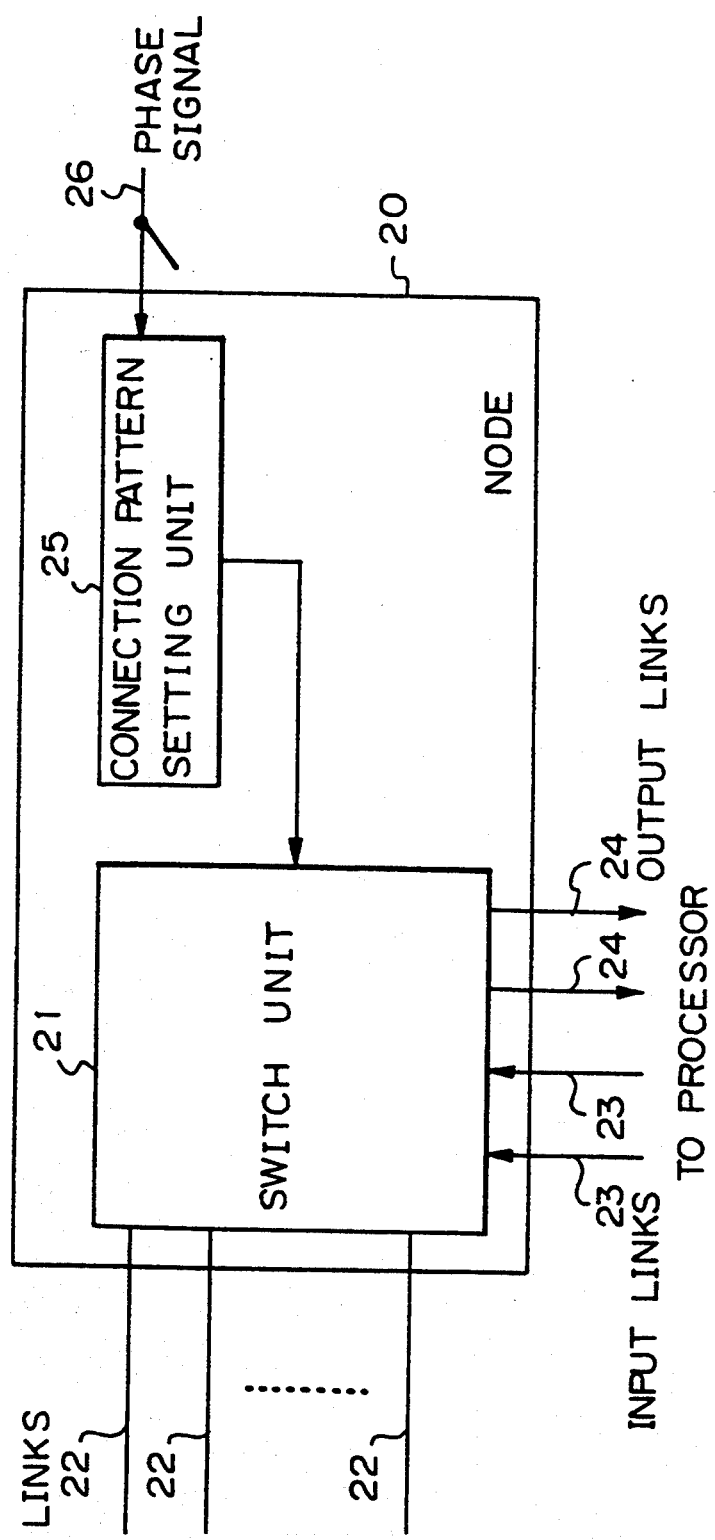
FIG. 3 is a basic structural view of a node according to the present invention.

FIG. 3 is a basic structural view of a node according to the present invention. A plurality of nodes are connected to each other through links in such a manner that they form the hyper cube type network shown in FIG. 1.

In FIG. 3, reference number 20 denotes a node, 21 a switch unit, 22 links, 23 input links, 24 output links, 25 a connection pattern setting unit and 26 a phase signal. Each link 22 is connected to another node, and the input links 23 and the output links 24 are connected to the processor. The switch unit 21 is connected to the links 22, the input links 23, and the output links 24, and switches the interconnection among these links in accordance with a connection pattern set by the setting connection pattern unit 25 synchronized with the phase signal 26.

The node 20 is one of $2^n$ nodes, each having the same structure in the n-dimensional hyper cube type network, and each node 20 is connected by n sets of links 22 to nodes other n.

The connection pattern setting unit 25 determines $2^n$ connection patterns synchronized with, or corresonding to the phase signal 26. In this case, one period is constituted by $2^n$ phases simultaneously supplied to all nodes. One phase signal contains n messages and can process $2^n$ messages, and accordingly, the all-to-all burst communication is processed by $2^n$ phases. Thus, a phase signal is a signal of a group (phase) of n messages, for example, 3 bits, and can transmit $2^n$ different phases, for example, 2 different 3-bit groups, each of which indicates a node, for example, one of 8 nodes.

The switch unit 21 controls $2^n$ kinds of connections during one period to interconnect the links 22 and the input links 23, and the links 22 and the output links 24, based on the connection patterns supplied from the unit 25.

According to the above control, the busy state and waiting state of the link when relaying the message do not occur in the network. Thus, without congestion of the message at the communication path, the processing performance of the network can be raised when performing an all-to-all burst communication.

Figure 4:
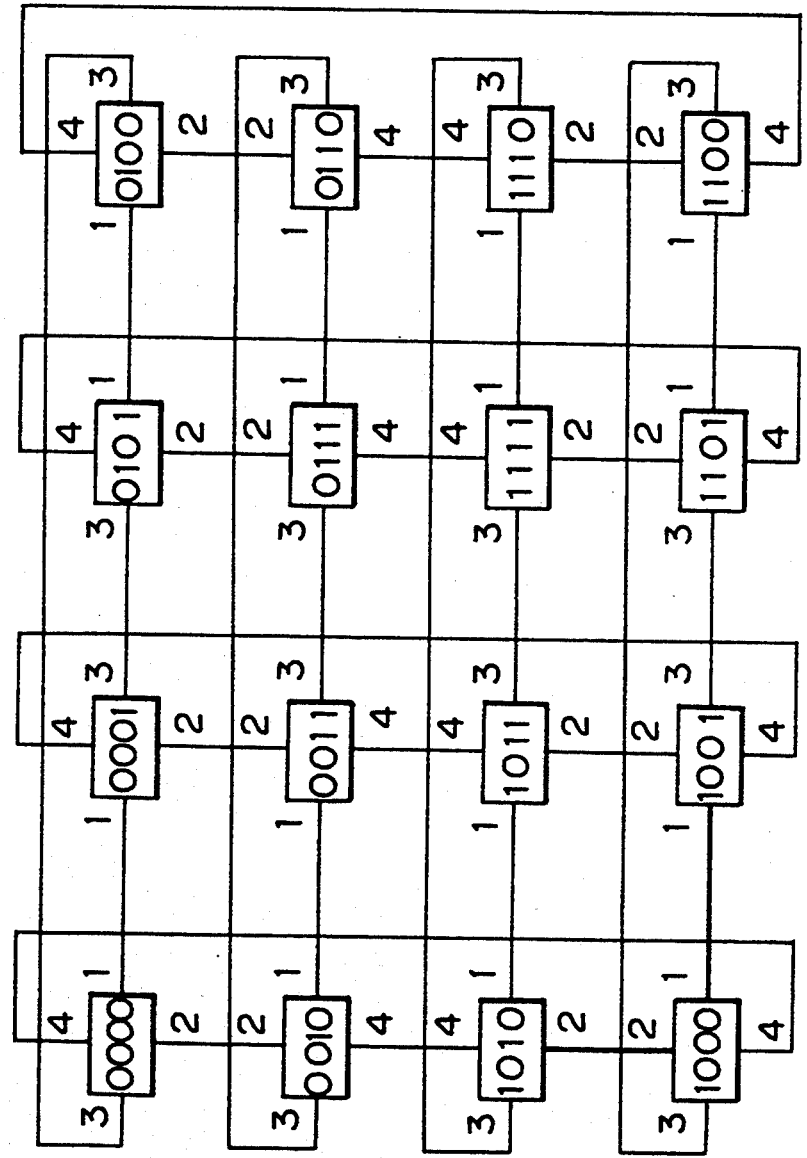
FIG. 4 is one example of the connection of a four-dimensional hyper cube type network.

FIG. 4 is one example of the connection of a four-dimensional hyper cube type network. Each of the nodes of the four-dimensional (n=4) hyper cube type network is connected in accordance with the above mentioned connection rule. The binary number (0000, 0001—) at each node is the node designation, and the number at each line is the link number.

Figure 5:
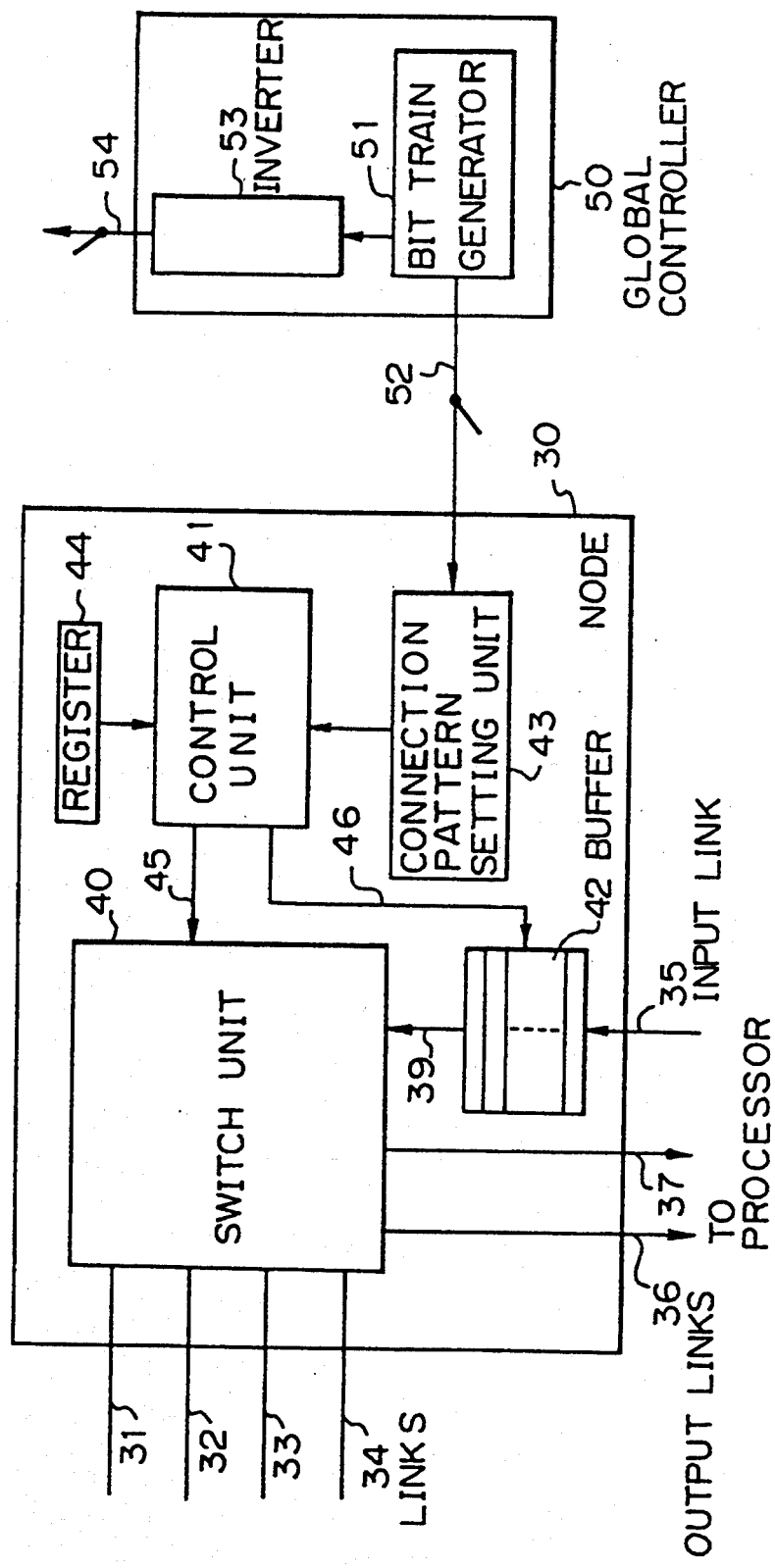
FIG. 5 is a schematic block diagram of a node according to one embodiment of the present invention.

FIG. 5 is a schematic block diagram of a node according to one embodiment of the present invention.

In FIG. 5, reference number 30 denotes a node, 31 to 34 links, 35 an input link, 36 and 37 two output links, 39 an input line, 40 a switch unit, 41 a control unit, 42 a buffer memory, 43 a connection pattern setting unit, 44 a register, 50 a global controller, 51 a bit train generator, 52 a signal line, 53 an invertor, and 54 a signal line.

Node 30 is connected to the links 31 to 34 and to the processor through the input link 35 and two output links 36, 37. The input link 35 is connected to the switch unit 40 through the buffer 42 and the input line 39. The messages are temporarily stored in the buffer 42 and sequentially read out from the buffer 42 to the switch unit 40 through the input signal line 39. The buffer 42 has, for example, sixteen memory areas corresponding to the sixteen nodes shown in FIG. 4, and temporarily stores each message to be transferred from the processor to each node.

The control unit 41 controls the connection configuration at the switch unit 40 and selection of the message read out from the buffer 42 based on the connection patterns supplied from the connection pattern setting unit 43 and its own node designation held in the register 44.

The connection pattern setting unit 43 receives the bit train (here the bit train has four bits, since this embodiment concerns a four-dimensional (n=4) network) of the phase signal simultaneously supplied from the global controller 50 to each node 30. This bit train is transferred to the control unit 41 as a four-bit connection pattern. The global controller 50 comprises the bit train generator 51 and the inverter 53, and is provided in common in the hyper cube network.

The bit train generator 51 is a phase signal generating means which generates different bit trains at constant time intervals set as being sufficient for transferring one message. This bit train is transferred to all nodes having an even node designation through the signal line 52, and simultaneously, the bit train inverted by the inverter 53 is transferred to all nodes having an odd node designation through the signal line 54. The bit train generator 51 can generate $2^n$ kinds of bit trains during one period.

The even node designations are those containing zero or even numbers of the bit "1" in the bit train, and the odd node designations are those containing odd numbers of the bit "1" in the bit train. For example, the node designations "0000", "0101", "1111", etc., are even node designations, and the node designations "0001", "1011", etc., are odd designations. The control unit 41 decodes the connection pattern from the connection pattern setting unit 43 and generates the predetermined control signal.

The execution of the connection rule by the switch unit 40 is briefly explained hereinafter.

The interconnection between the links and between the input/output links is performed in such a way that, each of the bits from the first to n'th of the connection pattern corresponds to each of the links from the first to n'th, respectively. The input link is connected to the link corresponding to the most significant bit of the bit "1" contained in the connection pattern. The remaining bits "1" are paired from the upper (most significant remaining "1") bit and each pair of links is connected corresponding to each pair of bits, respectively. The bits "0" contained in the connection pattern are paired from the upper (most significant "0") bit and each pair of links is connected corresponding to each pair of bits, respectively. Further, when the bit "1" does not exist in the connection pattern, the input link is connected to the output link 36. When even numbers of the bit "1" exist in the connection pattern, the bit "1" of the least significant bit unconnected by the above connection rule is connected to the output link 36. Finally, when odd numbers of the bit "1" exist in the connection pattern, the bit "0" of the least significant bit unconnected by the above connection manner is connected to the output link 37.

Figure 6:
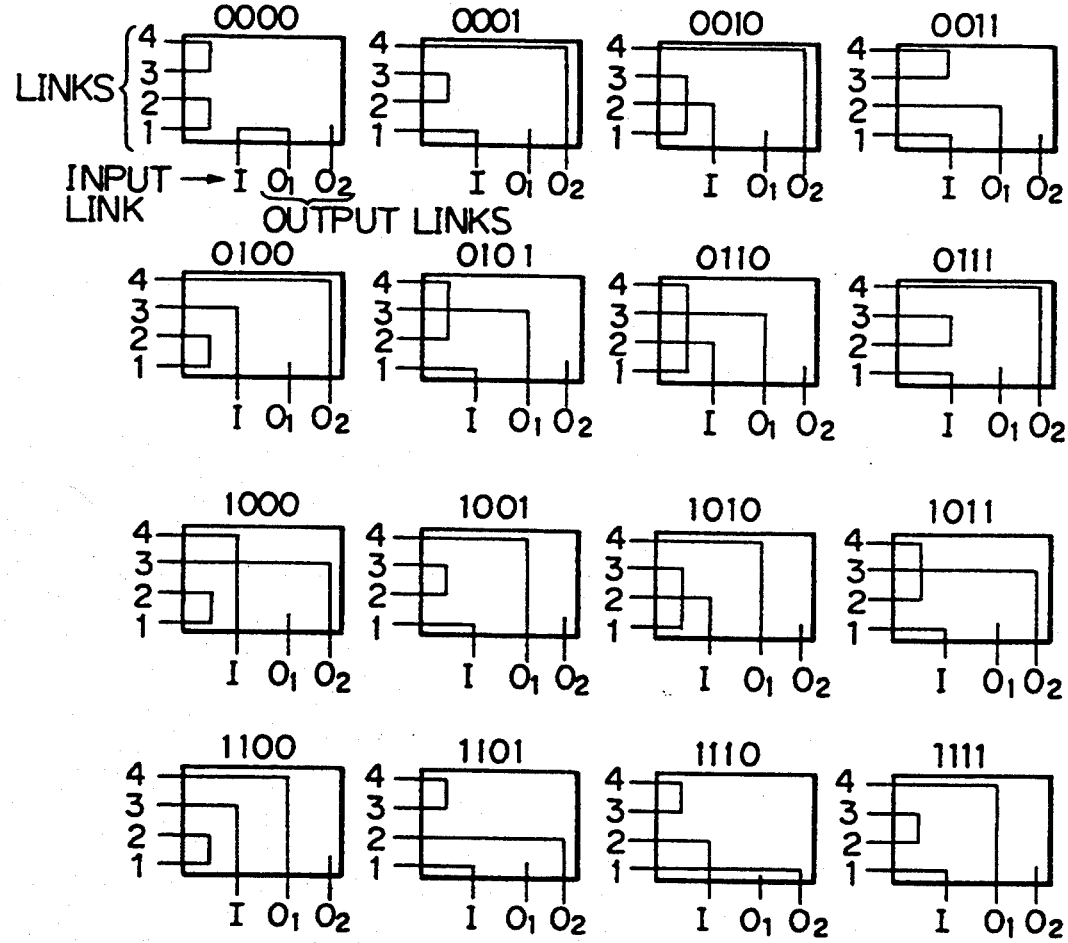
FIG. 6 is a view for explaining the connection configuration of the switch unit corresponding to each connection pattern.

FIG. 6 is a view for explaining the connection configuration of the switch unit 40 corresponding to each connection pattern.

In FIG. 6, reference numbers 1 to 4 denote links corresponding to links 31 to 34 in FIG. 5, "I" denotes an input line corresponding to the input line 39, and "$O_1$" and "$O_2$" denote two output lines corresponding to the output lines 36 and 37.

In this case, the control unit 41 in FIG. 5 obtains an "exclusive OR" between the connection pattern and its own node designation contained in the register 44, to determine the node designation of the destination. The control unit 41 then transfers the obtained "exclusive OR" as the control signal to the buffer 42, where the message at the area assigned by the destination is read out from the buffer and transferred to the input line 39.

For example, when the connection pattern is "0011", the node having an even node designation, for example, "1000" is connected to the node designated "1010", as shown by the thick lines in FIG. 4. The connection configuration of the connection pattern "0011" is shown in FIG. 6. The input line I is connected to the first link 1 so that the input message is transferred to the node designated "1000" shown in FIG. 4.

In this case, since the node designation "1000" is for an odd node designation, the inverted connection pattern "1100" is used as the connection pattern. The connection pattern "1100" is shown in FIG. 6. That is, the first link 1 is connected to the second link 2 so that the message input from the first link 1 (connected to mode "1001") is transferred to the second link 2 and further transferred to the node designated "1010".

In the node designated "1010", since this is an even node designation, again the connection pattern "0011" is used. The connection configuration of the connection pattern "0011" is shown in FIG. 6, as already explained. That is, the second link 2 is connected to the output $O_1$. Accordingly, the message input from the processor of the node designated "1001" is transferred to the processor of the node designated "1010".

Figure 7A:
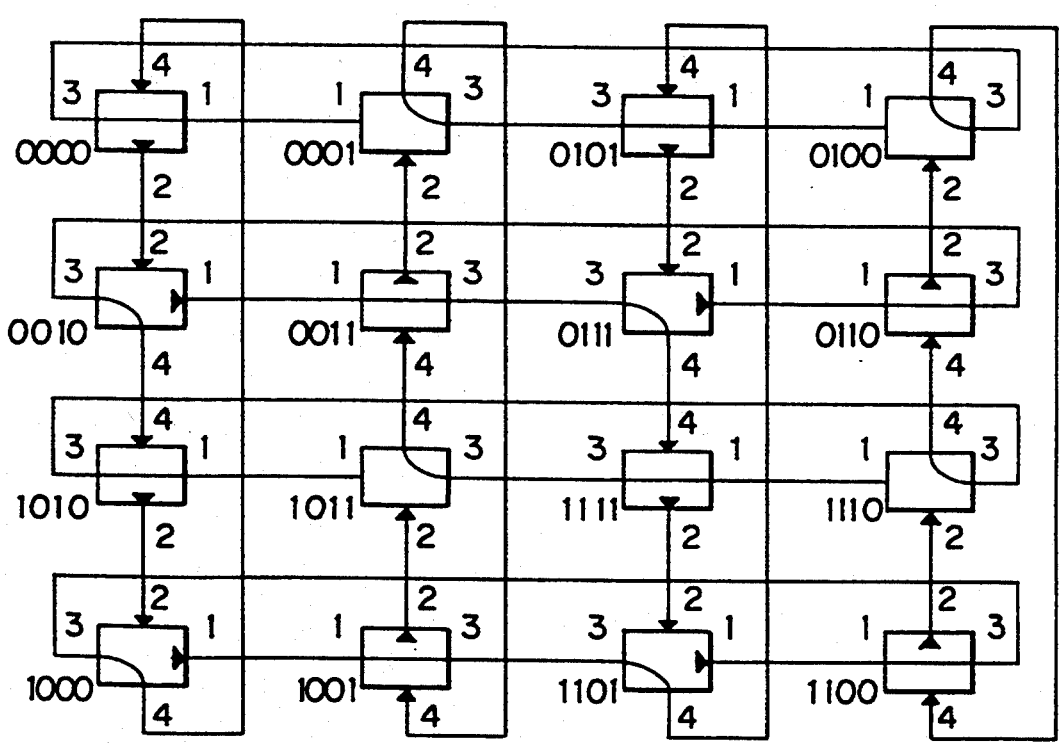
FIGS. 7A, 7B and 7C are views for explaining various communication paths corresponding to various connection patterns.
Figure 7B:
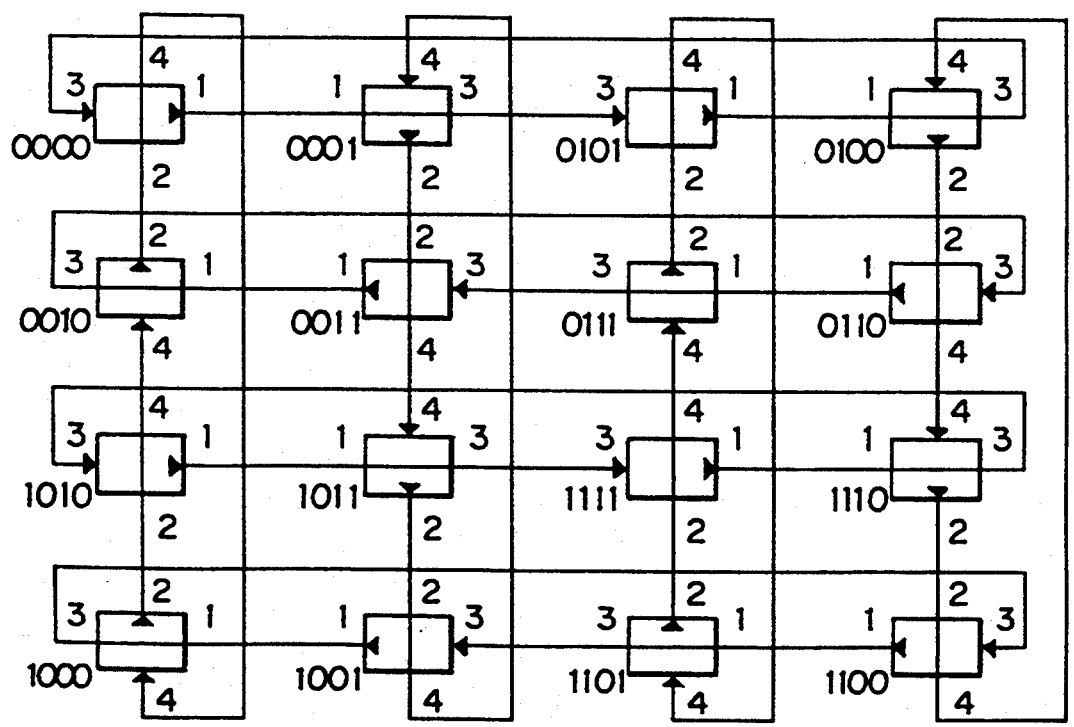
Figure 7C:
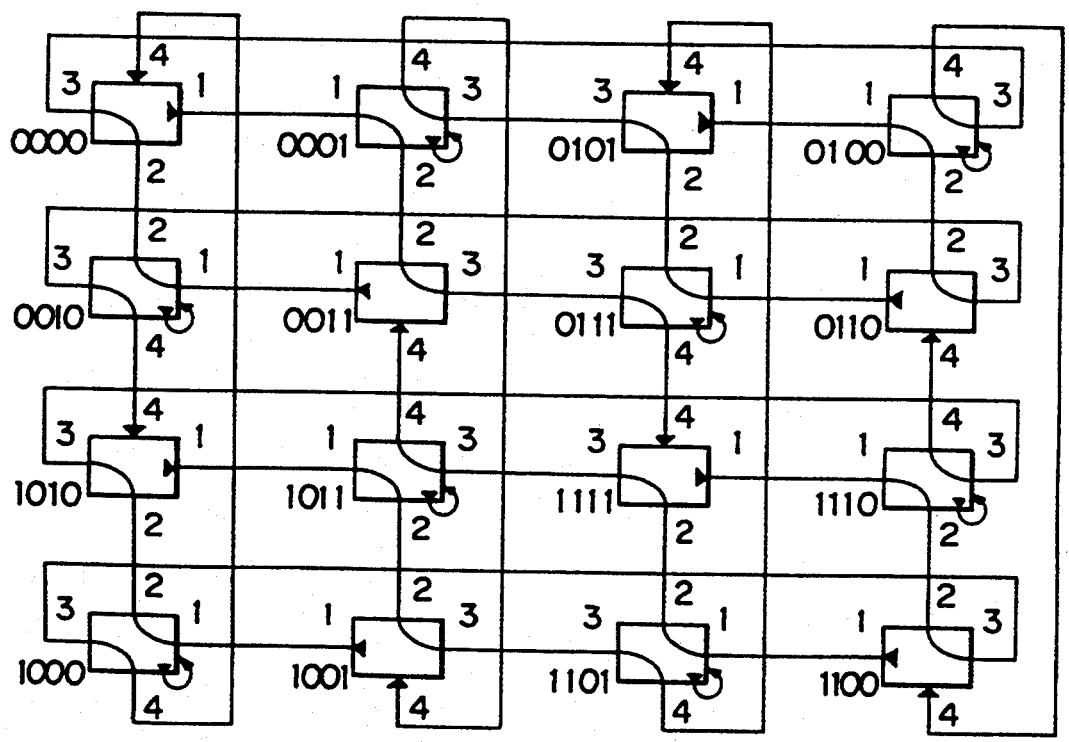

FIGS. 7A, 7B and 7C are views for explaining various communication paths in the hyper cube network. FIG. 7A shows the case where the connection pattern at the even node designations is "0010" FIG. 7B shows the case where the even node connection pattern is "0101", and FIG. 7C shows the case where the even node connection pattern is "1111". As is obvious from the above, the connection patterns at the odd node designations are "1101" "1010" and "0000", respectively.

In the above embodiment, the output links $O_1$ and $O_2$ are not used simultaneously because the dimension of the network is even (for example, n=4). When the dimension is odd (for example, n=3), both output lines $O_1$ and $O_2$ are used in a certain node and not used in the remaining nodes.

Figure 8:
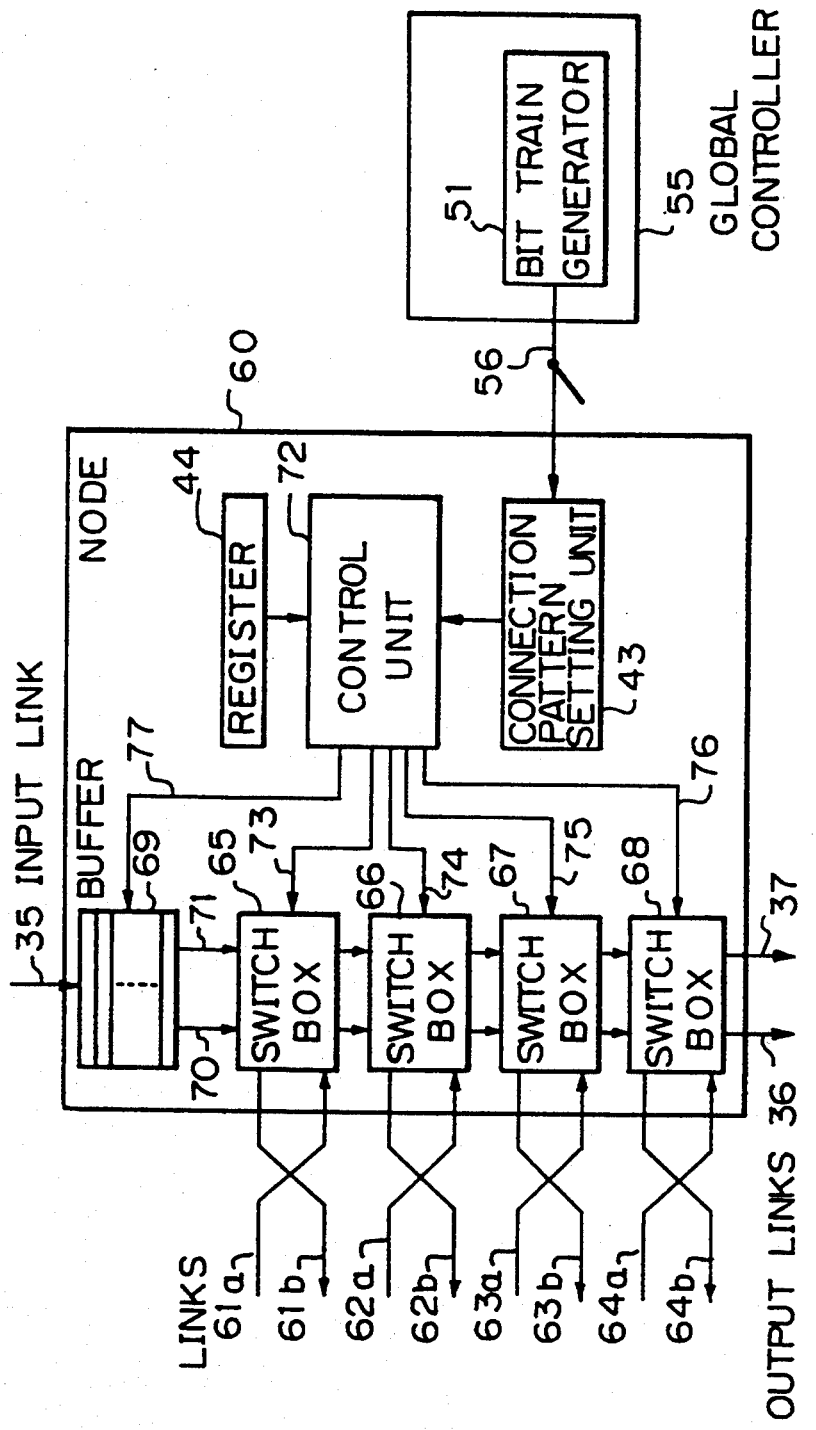
FIG. 8 is a schematic block diagram of a node according to another embodiment of the present invention.

FIG. 8 is a schematic block diagram of the node according to another embodiment of the present invention. In FIG. 8, reference number 60 denotes a node, 61a to 64b links, 65 to 68 switch boxes, 69 a buffer memory, 73 to 76 input signal lines, and 72 a control unit. Each of the switch boxes 65 to 68 is connected to each of a pair of links 61a and 61b, 62a and 62b, 63a and 63b, and 64a and 64b. The switch box 65 is connected to two input links 70 and 71, and the switch box 68 is connected to two output links 36 and 37.

The interconnections between the links, and between the link and the input/output links are performed in such a way that, when a corresponding bit of the connection pattern is "1" the switch box is set to the first connection configuration, and when the bit of the connection pattern is "0" the switch box is set to the second connection configuration, as explained in detail hereinafter.

Figure 9A:
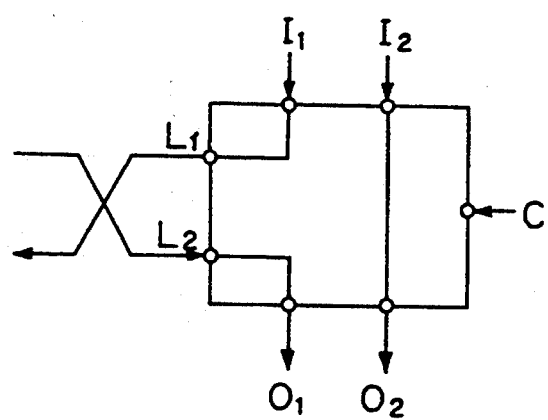
FIGS. 9A and 9B are views for explaining connection configurations of the switch box in FIG. 8.
Figure 9B:
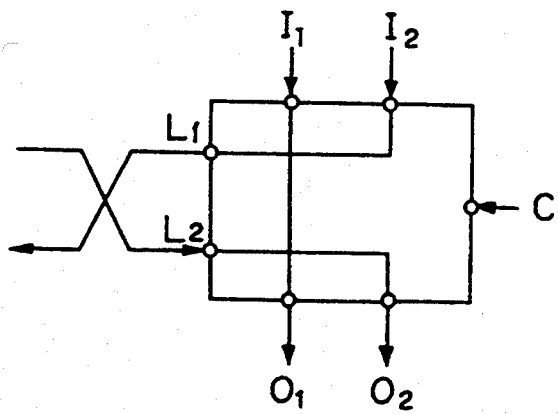

FIGS. 9A and 9B are views for explaining the connection configurations of the switch box. Each switch box comprises two input terminals $I_1$ and $I_2$, two output terminals $O_1$ and $O_2$, two link terminals $L_1$ and $L_2$, and a control terminal C. These connection configurations are switched by a control signal input to the control terminal C from the control unit 72. Two output terminals $O_1$ and $O_2$ are connected to the next corresponding input terminals $I_1$ and $I_2$, and two output terminals $O_1$ and $O_2$ of the end switch box 68 are connected to the output links 36 and 37, respectively.

A message is input from the input link 35 and stored in the buffer 69. The buffer 69 is divided into, for example, sixteen memory areas corresponding to all of the nodes, and sequentially stores the message from the processor.

The control unit 72 generates one destination node designation based on the exclusive OR from the connection pattern and the own node designation held in the register, and the other destination node designation based on the bits inverted from the exclusive OR by the control unit. Two destination nodes determined by the control unit 72 are input to the buffer 69 through the signal line 77. Two messages designated by the control signal are read out from the predetermined area and input to the switch box 65 through the signal lines 70 and 71.

The connection pattern setting unit 43 receives the bit trains simultaneously transferred to each node as the phase signal. The bit trains are supplied from the bit train generator 51 in the global controller 55 commonly provided in the hyper cube network. The bit trains, for example, four-bits trains, are transferred to the controller 72 through the connection pattern setting unit 43.

The bit train generator 51 generates different bit trains at constant time intervals set as being sufficient for transferring one message. In this case, the bit train generator 51 generates $2^n$ kinds of bit trains during one period.

The control unit 72 generates the control signal to be input to each control-terminal C of each switch box. Each switch box is changed by the control signal between two connection configurations shown in FIGS. 9A and 9B. That is, when the control signal is "1" the connection configuration is shown by FIG. 9A, and when the control signal is "0" the connection configuration is shown by FIG. 9B. Accordingly, for example, when the connection pattern is "0110", the switch boxes 65 and 68 are set to the connection configuration shown in FIG. 9B, and the switch boxes 66 and 67 are set to the connection configuration shown in FIG. 9A.

As explained above, the first connection configuration shown in FIG. 9A is formed by connecting the first input terminal $I_1$ and the first link terminal $L_1$, the second input terminal $I_2$ and the second output terminal $O_2$, and the second link terminal $L_2$ and the first output terminal $O_1$. The second connection configuration shown in FIG. 9B is formed by connecting the first input terminal $I_1$ and the first output terminal $O_1$, the second input terminal $I_2$ and the first link terminal $L_1$, and the second link terminal $L_2$ and the second output terminal $O_2$, respectively.

Figure 10:
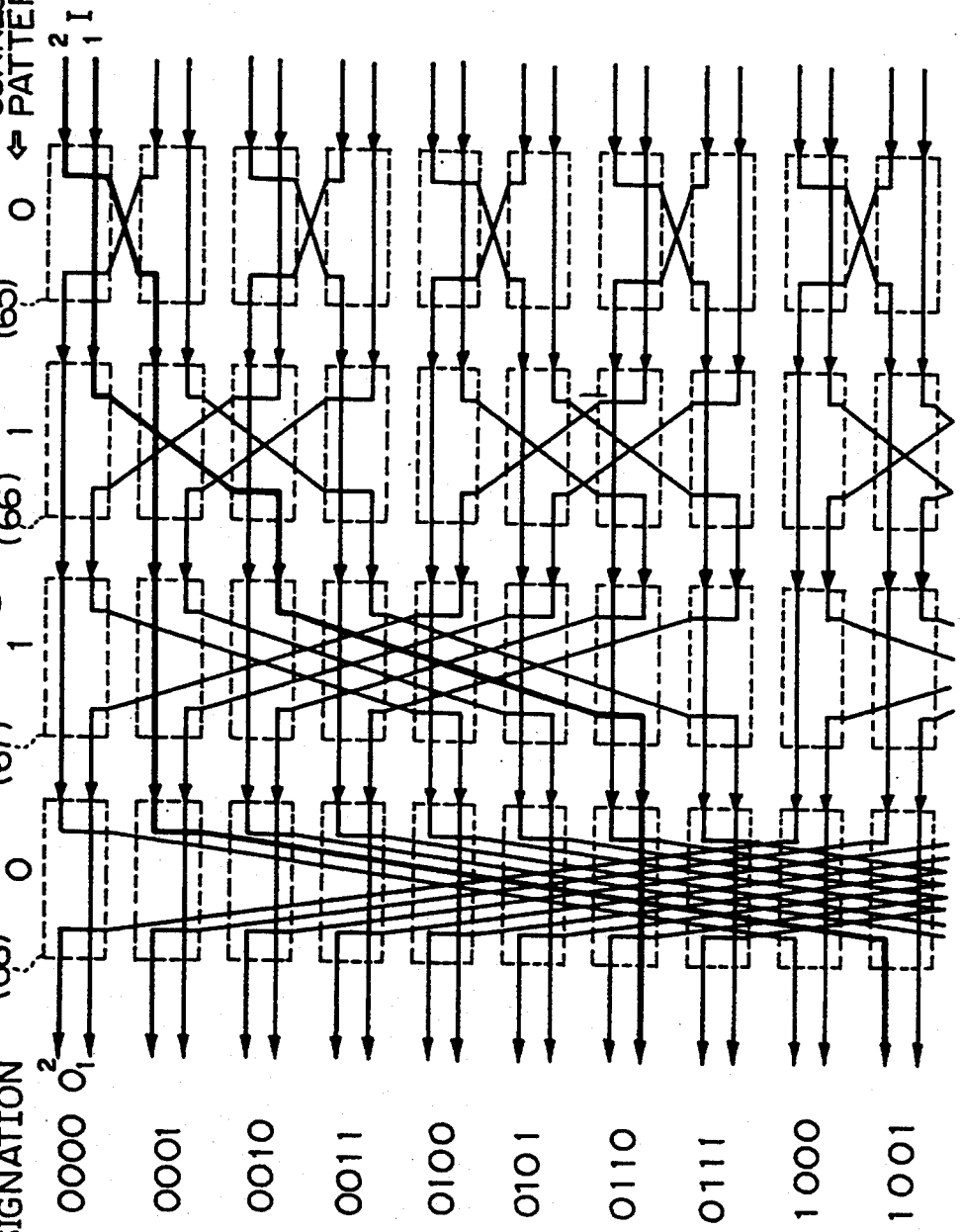
FIG. 10 is a view for explaining one example of the connection configuration of the communication path in the embodiment shown in FIG. 8.

FIG. 10 is a view for explaining one example of the connection configuration of the communication path.

In FIG. 10, the connection pattern is "0110". Each of the boxes (dotted line) corresponds to the switch box 65 to 68 shown in FIG. 10. Further, $I_1$ and $I_2$ are the input links and $O_1$ and $O_2$ are the output links. As is obvious, when the connection pattern is "0" the switch box takes the connection configuration shown by FIG. 9B, and when the connection pattern is "1" the switch box takes the connection configuration shown by FIG. 9A.

For example, as shown by the thick line, the input link $I_1$ of the node designated "0000" is connected to the node designated "0010" through their respective switch boxes 66 after passing through the switch box 65 of the node designated "0000". Further, the node designated "0010" is connected to the node designated "0110" through their respective switch boxes 67, and connected to the output link $O_1$ of the node designated "0110", via its switch box 63.

In case of the input link 12 of the node designated "0000", as shown by another thick line in FIG. 10, the node designated "0000" is connected to the node designated "1001" through the switch box 65 of the node designated "0000" the switch boxes 65 to 68 of the node designated "0001" and the switch box 68 of the node designated "1001". Although only 10 of 16 nodes are illustrated in FIG. 10, it should be apparent that the nodes are connected in a hyper cube type network where n=4. Also, it is obvious that the destination node designation "1001" is inverted from the node designation "0110". Accordingly, it is possible to automatically designate two destination nodes in the present invention.

Figure 11:
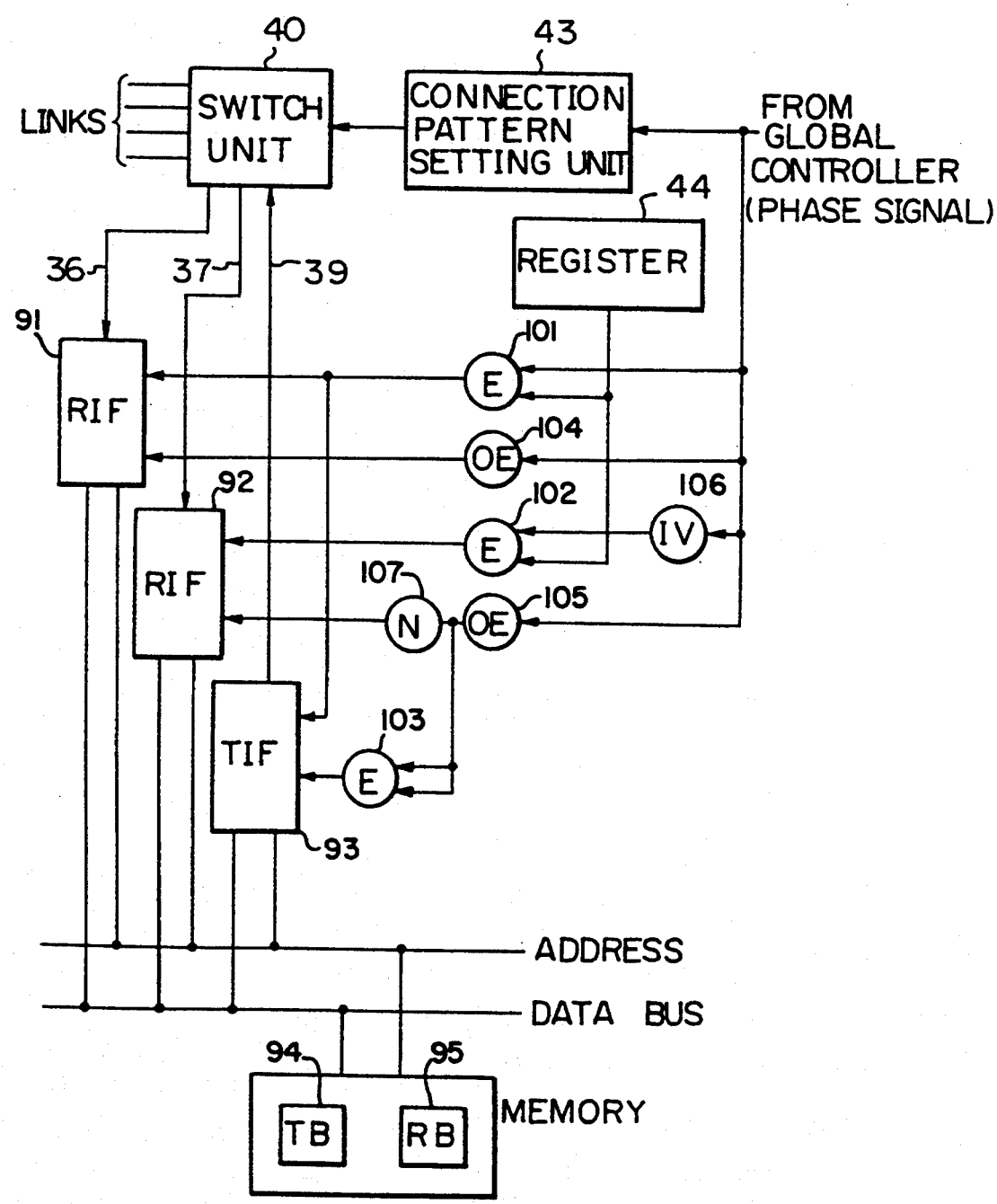
FIG. 11 is a schematic block diagram for explaining the relationship between the node and the interfaces to the processor with regard to the first embodiment shown in FIG. 5.

FIG. 11 is a schematic block diagram for explaining the relationship between the node and the interfaces to the processor.

In FIG. 11, RIF denotes a reception memory interface 91, 92, TIF a transmission memory interface 93, E an exclusive OR circuit 101, 102, 103, OE an odd/even judgement circuit 104, 105, IV a bit inverter 106, N a NOT circuit 107, TB a transmission buffer 94, and RB a reception buffer 95.

This figure corresponds to the first embodiment shown in FIG. 5. Namely, the switch unit 40 corresponds to the switch unit 40 in FIG. 5; the two interfaces RIF 91, 92, the interface TIF 93, and the memory correspond to the buffer 42 and the peripheral portions in FIG. 5. Moreover, and the connection pattern setting unit 43, the register, the exclusive OR circuits 101, 102, 103 and the odd/even judgement circuits 104, 105 correspond to the register, the control unit and the connection pattern setting unit shown in FIG. 5.

The node includes two interfaces RIF 91, 92 and one interface TIF 93 both connected to the address bus and the data bus of the processor. The interface TIF inputs the messages read out sequentially from the buffer TB 94 to the switch unit 40 through the address and the data bus lines. The interface RIF 91, 92 stores the messages read out from the switch unit 40 to the buffer RB 95 in the memory through the address and the data bus lines.

The buffer TB 94 has, for example, sixteen entries one corresponding to each of the nodes. The interface TIF 93 comprises, for example, sixteen registers corresponding to all of the nodes, and each of the registers stores the start address of each entry in the buffer TB 94. Similarly, the buffer RB 95 has, for example, sixteen entries corresponding to all of the nodes. The interface RIF 91, 92 comprises, for example, sixteen registers one corresponding to each of the nodes, with each register storing the start address of each entry in the buffer RB 95.

The interconnections between links are controlled by the control signal received from the connection pattern setting unit 43. As mentioned above, the connection pattern setting unit receives the bit train simultaneously transferred from the global controller to each node as the phase signal.

Figure 12:
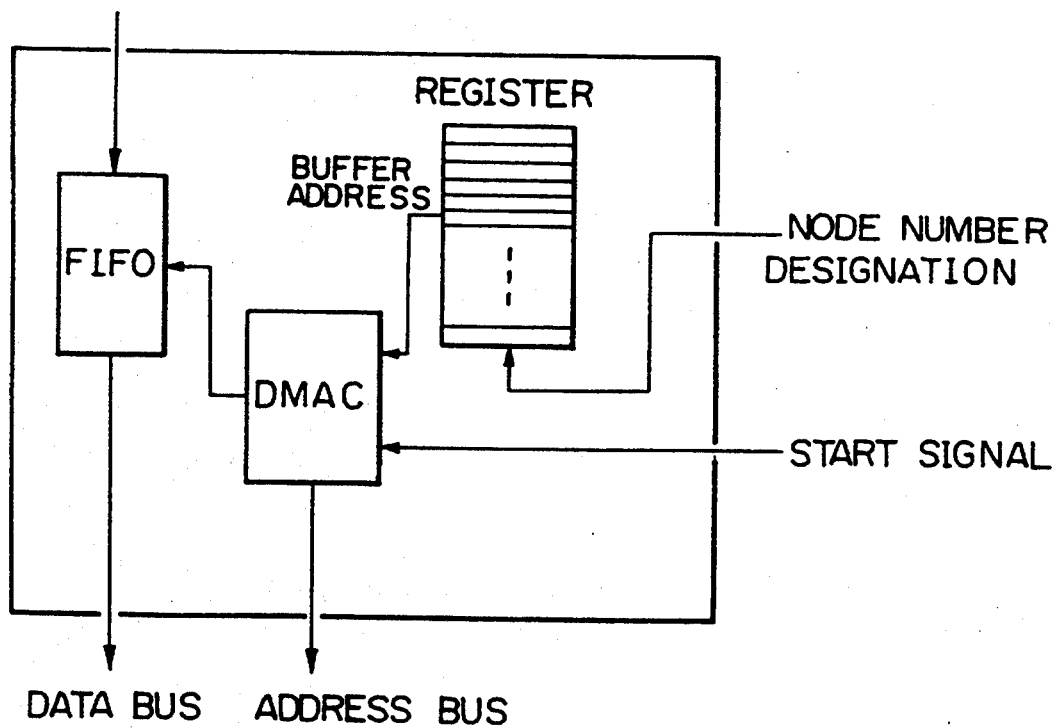
FIG. 12 is a detailed block diagram of the reception memory interface shown in FIG. 11.
Figure 13:
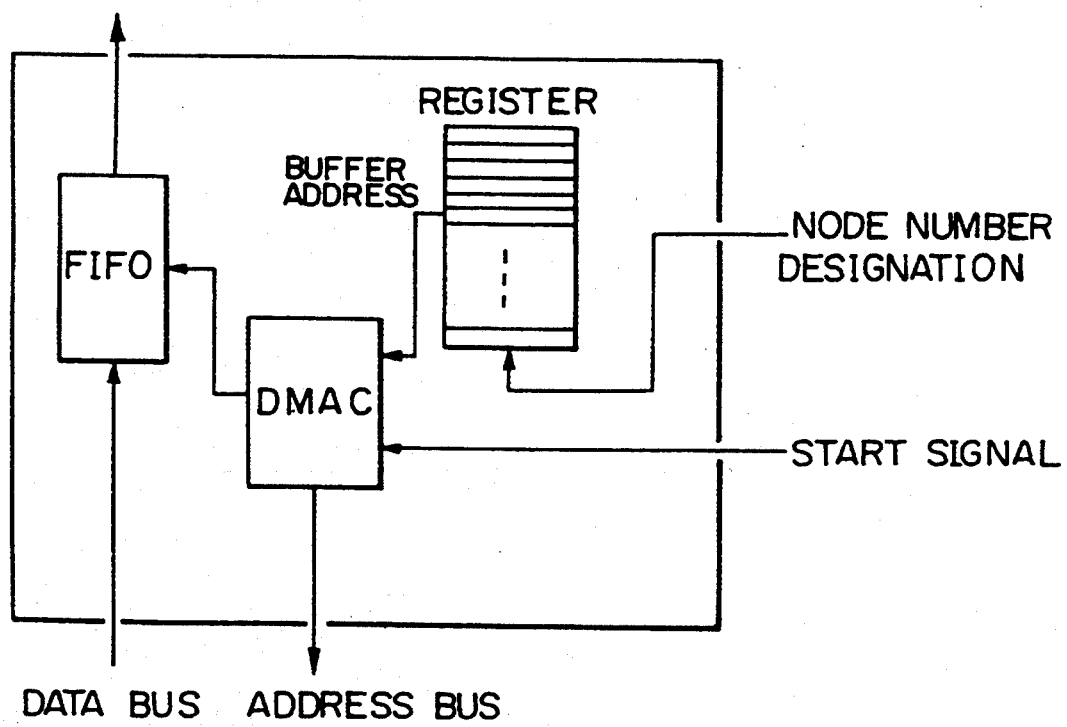
FIG. 13 is a detailed block diagram of the transmission memory interface shown in FIG. 11.

FIG. 12 is a detailed block diagram of the reception memory interface, and FIG. 13 is a detailed block diagram of the transmission memory interface. The interfaces RIF and TIF are controlled by the phase signal from the global controller, and the control signal generated by its own node number from the register having its own node number.

The interface RIF receives a node number designation signal and a start signal as the control signal. The direct memory access controller DMAC refers the entry of the reception buffer RB based on the address stored in the register corresponding to the node designated by the node number designation signal when the start of the reception is designated by the start signal, and stores the message, which is input from the output link of the switch unit to the FIFO, to the corresponding entry.

The interface TIF receives the node number designation signal and the start signal as the control signal. The DMAC refers the entry of the transmission buffer TB based on the address stored in the register corresponding to the node designated by the node number designation signal when the start of the transmission is designated by the start signal, and inputs the message stored in the corresponding entry to the FIFO. The transmission message input to the FIFO is output immediately to the input link of the switch unit.

The node number designation signal to the interface TIF is generated by calculating the exclusive OR between the phase signal and its own node number, The start signal to the interface TIF is always turned ON. The node number designation signal to the interface RIF (connected to the line 36) is generated by calculating the exclusive OR between the phase signal and its own node number. The node number designated signal to the interface RIF (connected to the line 37) is generated by calculating the exclusive OR between the inverted phase signal and its own node number.

Further, the start signal to the interface RIF (connected to the line 36) is turned ON when the phase signal is even, and the start signal to the interface RIF (connected to the line 37) is turned ON when the phase signal is odd.

Figure 14:
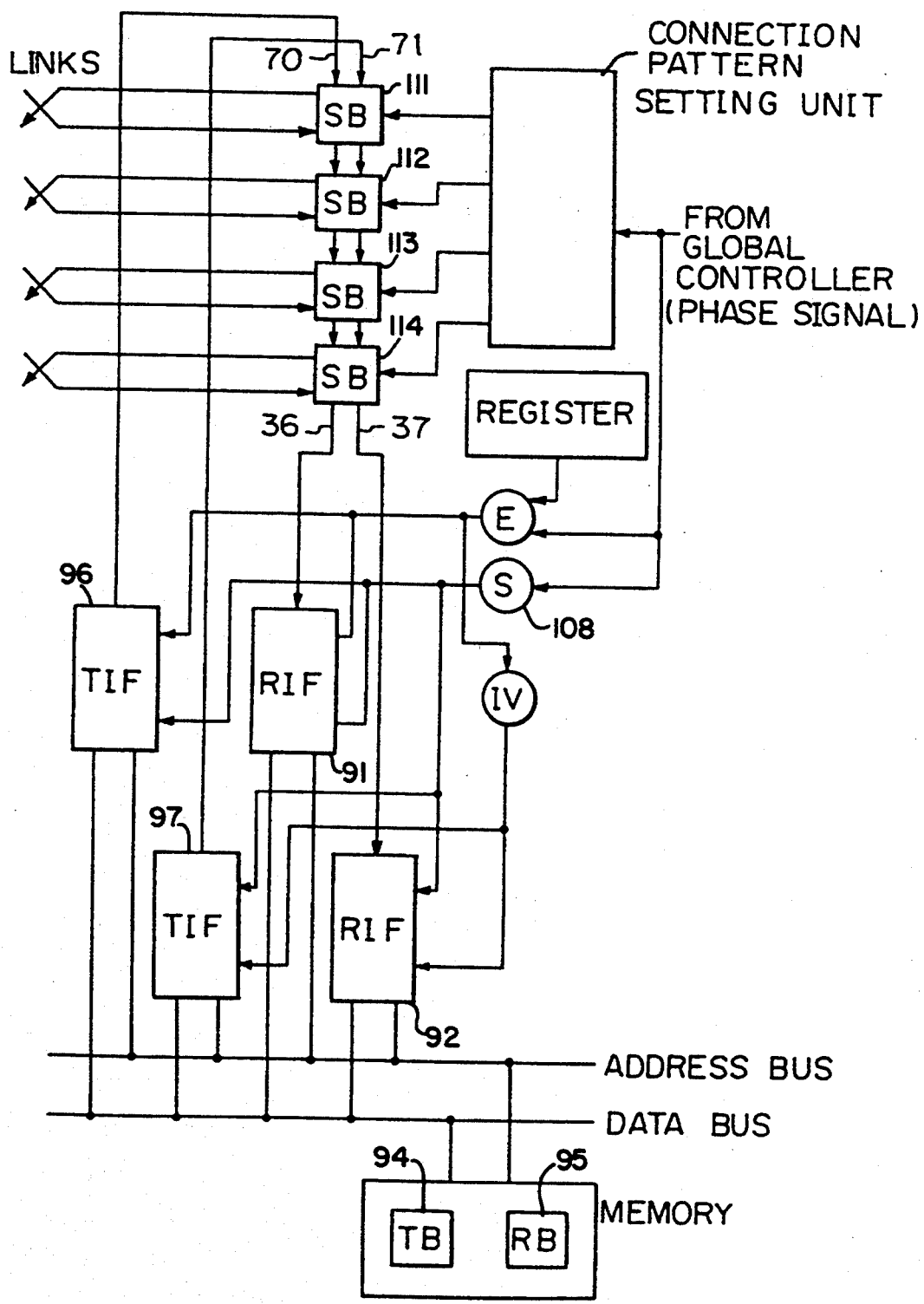
FIG. 14 is a schematic block diagram for explaining the relationship between the node and the interfaces to the processor regarding the second embodiment shown in FIG. 8.

FIG. 14 is a schematic block diagram for explaining the relationship between the node and the interfaces to the processor. This figure corresponds to the second embodiment shown in FIG. 8. The same reference numbers shown in FIG. 11 are used for the same components of FIG. 14. S denotes the start signal generation circuit 108.

The node includes two interfaces RIF 91, 92 and two interfaces TIF 96, 97 connected to the address bus and the data bus. Two input terminals of the first switch box 111 are connected to the corresponding interfaces TIF 96, 97. Two output terminals of the fourth switch box are connected to the corresponding interfaces RIF 91, 92. The interface TIF 96, 97 reads out the message from the buffer TB 94, as in the first embodiment and outputs the message to the corresponding input terminal. The interface RIF 91, 92 inputs the message from the corresponding output terminal, as in the first embodiment, and stores the message to the buffer RB 95. The transmission buffer TB 94 and the reception buffer RB 95 have the same structure as in the first embodiment.

The interconnection of each switch box is controlled by the control signal from the connection pattern setting unit. The connection pattern setting unit receives the bit train, and transmits the control signal to control the connection configuration of each switch box in such a way that the switch box is set to the first connection configuration when the bit is "1", and set to the second connection configuration when the bit is "0".

The node number designation signal to the interface TIF 96 (connected to the line 70) is generated by calculating the exclusive OR between the phase signal and its own node number in the register. The node number designation signal to the interface 97 (connected to the line 71) is generated by calculating the inverted exclusive OR between its phase signal and the own node number.

The node number designation signal to the interface RIF 91 (connected to the line 36) is generated by calculating the exclusive OR between the phase signal and its own node number. The node number designation signal to the interface RIF 92 (connected to the line 37) is generated by calculating the inverted exclusive OR between the phase signal and its own node number. The start signal to the interfaces TIF and RIF are always turned ON. Further, the start signal generation circuit S 108 is provided for detecting the start point of the phase signal from the global controller.

Figure 15:
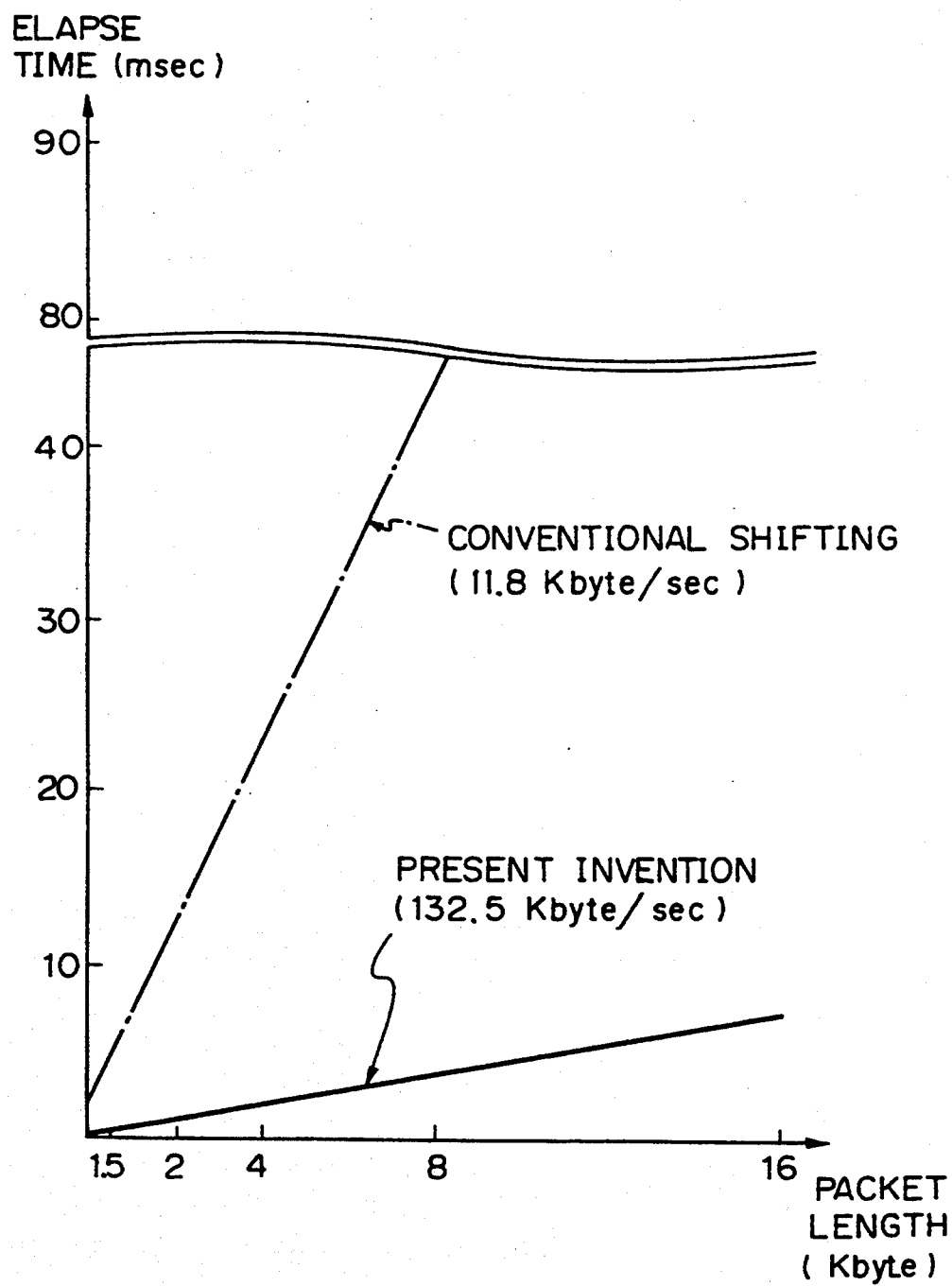
FIG. 15 is a graph for comparing the present invention and the conventional art.

FIG. 15 is a graph for comparing the present invention and the conventional art.

In FIG. 15, the ordinate denotes an elapsed time (msec), and the abscissa denotes a packet length (Kbyte). A CAP (Cellar Array Processor), a multiprocessor system developed by Fujitsu Laboratories Ltd. having sixty-four processors, was used in an experiment to produce the results illustrated in FIG. 15. The present invention was constituted by switch boxes of the CAP and the routing according to the present invention, and the conventional system was constituted by message passing by the CAP and routing according to the conventional art. Therefore, the former is compared with the latter with regard to the transmission arrays and the reception arrays. That is, the elapsed time is measured between the time when each element of the transmission arrays is transferred to different destination nodes and the time when the messages from the different destination nodes are received by each element of the reception arrays. As is obvious from the graph, the elapsed time of the present invention is about ten times better than that of the conventional system.

In accordance with the present invention, it is possible to uniformly perform an all-to-all burst communication among all nodes without congestion and waiting of the links in a hyper cube network. Further, in the second embodiment shown in FIG. 8, it is possible to reduce the processing time to half of that of the first embodiment since two sets of all-to-all bursts can be processed during one period.

I claim:

1. Each node in an n-dimensional hyper cube network having $2^n$ nodes, where n is a positive integer, each of the $2^n$ nodes interconnected to n other of the $2^n$ nodes by n internode links including a first internode link to an n-th internode link, and the n-dimensional hyper cube network having a bit train generator generating a phase signal of n bits, including a first bit to an n-th bit, with $2^n$ phases transmitted to each of the $2^n$ nodes, and a plurality of processors, each processor respectively connected to one of the $2^n$ nodes by input/output links, and the internode links and the input/output links providing communication paths between the plurality of processors through the $2^n$ nodes, said each node comprising:

connection setting means for receiving the phase signal and setting $2^n$ different connection patterns, each connection pattern respectively corresponding to one of the $2^n$ phases of the phase signal;

node designation means for storing a node designation having n designation bits uniquely identifying said each node, each of the n other of the $2^n$ nodes connected to said each node via the internode links having a node designation differing from the node designation of said each node by only one bit;

switching means for connecting a corresponding processor via an input link and first and second output links and the n other of the $2^n$ nodes via the internode links in one of the $2^n$ different connection patterns according to a connection rule; and control means for establishing the connection rule for the $2^n$ different connection patterns to be used by said switching means as follows when the node designation of said each node has no "1" bits or an even number of "1" bits, connections are indicated by the connection rule for each i-th internode link, corresponding to an i-th bit of the phase signal as i is incremented from 1 to n, to the input link if the i-th bit is a first "1" bit in the phase signal, to a j-th internode link if the i-th bit is "1", but not the first "1" bit and a j-th bit of the phase signal corresponding to the j-th internode link is "1" with no "1" bits between the i-th and j-th bits in the phase signal and if the i-th bit is "0" and the j-th bit is "0" with no "0" bits between the i-th and j-th bits in the phase signal, to the first output link if the i-th bit is "1" and no "1" bits corresponding to unconnected internode links remain in the phase bit signal, and to the second output link if the i-th bit is "0" and no "0" bits corresponding to unconnected internode links remain in the phase bit signal, and when the node designation of said each node includes an odd number of "1" bits, connections are indicated by the the connection rule for each i-th internode link, corresponding to an i-th inverted bit in an inverted phase signal as i is incremented from 1 to n, to the input link if the i-th inverted bit is a first "1" bit in the inverted phase signal, to a j-th internode link if the i-th inverted bit is "1" but not the first "1" bit and a j-th inverted bit of the inverted phase signal corresponding to the j-th internode link is "1" with no "1" bits between the i-th and j-th inverted bits in the inverted phase signal and if the i-th inverted bit is "0" and the j-th inverted bit is "0" with no "0" bits between the i-th and j-th inverted bits in the inverted phase signal, to the first output link if the i-th inverted bit is "1" and no "1" bits corresponding to unconnected internode links remain in the inverted phase bit signal, and to the second output link if the i-th inverted bit is "0" and no "0" bits corresponding to unconnected internode links remain in the phase bit signal.

2. Each node in an n-dimensional hyper cube network having $2^n$ nodes, where n is a positive integer greater than one, said each node interconnected to n other nodes by n internode links, and the n-dimensional hyper cube network having a bit train generator generating a phase signal of n bits with $2^n$ phases transmitted to each of the $2^n$ nodes, and a plurality of processors, each processor respectively connected to one of the $2^n$ nodes by input/output links, and the internode links and the input/output links providing communication paths between the plurality of processors through said nodes, said each node comprising:

connection setting means for receiving the phase signal and setting $2^n$ different connection patterns, each connection pattern respectively corresponding to one of the $2^n$ phases of the phase signal;

node designation means for storing a node designation having n designation bits uniquely identifying said each node, the node designation of each of the n other nodes connected to said each node via the internode links differing from the node designation of said each node by only one bit;

n switch boxes, each of said n switch boxes having first and second input terminals, first and second output terminals, first and second link terminals connected to a corresponding node via one of the internode links, and a control terminal, each of said n switch boxes having a first connection configuration and a second connection configuration, said switch boxes being interconnected in series by connecting the first and second output terminals of a previous switch box to the first and second input terminals of an adjacent switch box, respectively, each of the first and second input terminals at a first end of the series of said n switch boxes connected to one of two input links and each of the first and second output terminals at a second end of the series of said n switch boxes connected to one of two output links, the first link terminal of one of said switch boxes of said each node connected to the second link terminal of one of said switch boxes of another of the $2^n$ nodes, and the second link terminal of the one of said switch boxes of said each node connected to the first link terminal of the one of said switch boxes of the other of the $2^n$ nodes; and control means for controlling each of said switch boxes in accordance with the $2^n$ different connection patterns, each bit in each pattern determining control of a corresponding switch box to use the first connection configuration when the bit is "1" and when the bit is "0" the corresponding switch box is set to the second connection configuration.

3. A node as claimed in claim 2, wherein said switch boxes have the first connection configuration formed by connecting the first input terminal to the first link terminal, the second input terminal to the second output terminal, and the second link terminal to the first output terminal and the second connection configuration formed by connecting the first input terminal to the first output terminal, the second input terminal to the first link terminal, and the second link terminal to the second output terminal.

* * * * *

UNITED STATES PATENT AND TRADEMARK OFFICE
CERTIFICATE OF CORRECTION

PATENT NO. : 5,420,982

DATED : May 30, 1995

INVENTOR(S) : Riichiro Take, et al.

It is certified that error appears in the above-indentified patent and that said Letters Patent is hereby corrected as shown below:

On the title page:

Item: [75], Inventor:, "Setagaya," should be --Tokyo,--;

Item: [56], column 2, OTHER PUBLICATIONS, line 17, "Interconnecetion" should be --Interconnection--;

Col. 1,   line 54, "network" should be --networks--;

line 33, delete "a";

Col. 4,   line 21, "nodes" should be --node,--;

line 64, ""101"" should be --"101",--.

Col. 7,   line 54, ""0010"" should be --"0010",--.

UNITED STATES PATENT AND TRADEMARK OFFICE
CERTIFICATE OF CORRECTION

PATENT NO. : 5,420,982
DATED : May 30, 1995
INVENTOR(S) : Riichiro Take, et al.

It is certified that error appears in the above-indentified patent and that said Letters Patent is hereby corrected as shown below:

Col. 9, line 35, `""0000""` should be --`"0000",`--;
line 36, `""0001""` should be --`"0001",`--;
line 60, "register," should be --register 44,--.
Col. 10, line 51, "," should be --.--.
Col. 11, line 8, "box" should be --box 114--;
line 32, "the" should be --its--.

Signed and Sealed this

Seventh Day of November, 1995

Attest:

BRUCE LEHMAN

Attesting Officer      Commissioner of Patents and Trademarks